United States Patent Office 3,364,087
Patented Jan. 16, 1968

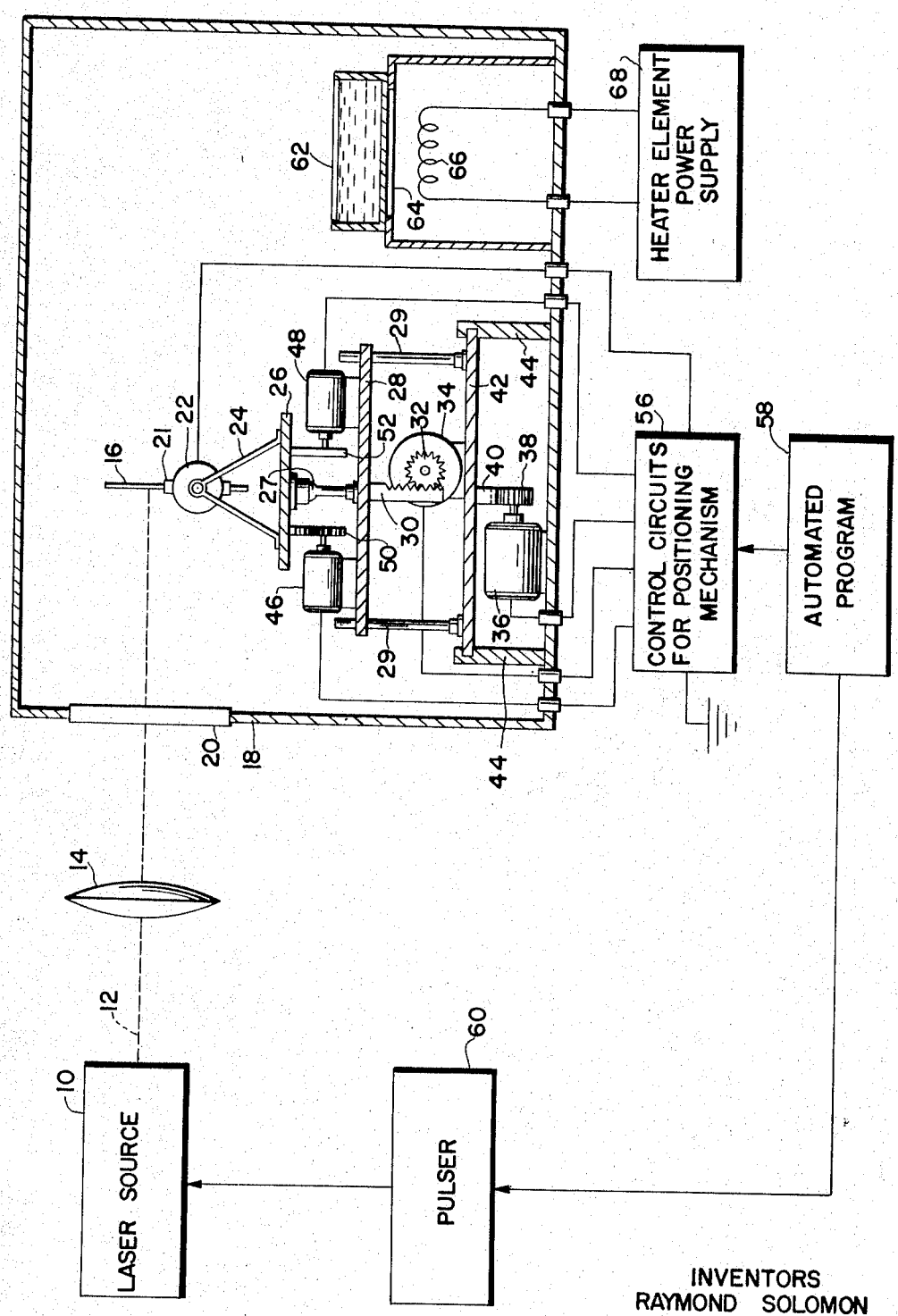

3,364,087
METHOD OF USING LASER TO COAT OR ETCH SUBSTRATE
Raymond Solomon, Sunnyvale, Calif., and Louis F. Mueller, Jr., Marblehead, Mass., assignors to Varian Associates, Palo Alto, Calif., a corporation of California
Filed Apr. 27, 1964, Ser. No. 362,867
4 Claims. (Cl. 156—4)

This invention relates to an improved method and means for processing and forming materials.

When working certain types of substances, such as refractory metals, and ceramics, for example, it is very difficult to machine the parts by conventional means. Generally, such materials must be worked under relatively high temperature conditions or require special tools and dies and expensive machinery for shaping and forming the work pieces.

Also, present technology is directed to miniaturization of parts, and the formation of microelements to fine tolerances, as found in integrated circuits, by way of example. In such cases it may be desirable to form minutely defined junctions or electrical circuit paths in small semiconductor bodies. However, presently known manufacturing techniques do not afford manufacture of such items on a high speed production basis. It would be desirable to achieve fine tolerance apertures, contours, and the like on work pieces in a simple, inexpensive and expeditious manner. It also would be desirable to fabricate miniature electrical circuit elements and combinations on a mass basis in an economical manner.

A class of light amplifying devices known as lasers is characterized by the production of an intense coherent light at high concentrated power and can be focused to a diameter smaller than a thousandth of an inch. A concentrated laser beam can generate very high temperatures and can be applied to very minute areas. A laser structure is relatively simple to manufacture and is not subject to extensive wear and deterioration, as experienced with purely mechanical parts generally employed for machine shop shaping and forming techniques.

The use of laser beams has been previously proposed for scribing and cutting materials. But such prior known methods depend solely upon the high temperatures obtained from the beam, and thus require very high input power. The use of very high powers has the disadvantage of damaging the substrate material by overheating and fusing the material around the hole produced by the laser beam.

An object of this invention is to provide an improved method and means for forming materials.

Another object of this invention is to provide an improved method and means for working refractory metals and ceramics.

Another object of this invention is to provide an improved method and means for processing semiconductor materials.

According to this invention, a workpiece is positioned in a chemically reactive atmosphere, and a laser beam is directed to the workpiece at a predetermined intensity and for a predetermined time. When the area impinged upon by the laser beam reaches a certain temperature, the workpiece reacts with the atmosphere. As a result, the part of the workpiece receiving the beam reacts to form a volatile compound leaving a finely defined etched spot, aperture, groove or slot. Alternatively, a nonvolatile compound may be formed, and subsequently dissolve in solution. The laser beam may be pulsed or continuous, and the workpiece may be transported relative to the beam by an automated control means.

In a particular embodiment of this invention, a tungsten body is supported within an atmosphere of iodine while a laser beam is applied to predetermined areas of the tungsten material. The tungsten body is moved by a positioning mechanism under the control of an electrical circuit, which in turn is controlled by an automated program or record, such as a pre-recorded magnetic tape. The program establishes a pattern that is etched on the surface of the tungsten. In this manner, the mass production of etched or cut tungsten pieces may be effectuated.

In an alternative embodiment, the workpiece may be a semiconductor material, such as silicon, disposed in a suitable doping atmosphere, such as arsenic or antimony. Upon the application of a laser beam, the doping material is diffused at the locally heated spot whereby junctions or circuit elements may be produced.

The invention will be described in greater detail with reference to the sole figure of the drawing, which is a schematic and block diagram of an embodiment of the invention.

With reference to the drawing, the inventive system comprises a laser source 10 which provides a laser beam 12 along an optical axis (Z direction). The laser source 10 may be a gas laser or a solid state laser, such as a ruby rod that is energized by a flash tube, as is well known in the art. The laser beam 12 is directed through an optical lens 14 which focuses the beam on a workpiece 16 positioned within an enclosure 18. An optically inactive transparent window 20 is located in the wall of the enclosure 18 facing the laser source 10 to allow the beam 12 to pass to the workpiece 16 without any diffraction or deviation from the optical path.

The workpiece 16 is maintained in the path of the beam 12 by holders or finger clamps 21 that engage opposing ends of the workpiece 16. The clamps 21 are coupled to a motor 22, which is supported by braces or legs 24 mounted to a pivotable table 26. The workpiece 16 may be tilted towards or away from the laser source 10 by means of the drive motor 22, which has its drive shaft coupled by bushings to the opposing finger clamps 21.

The table 26 is set on a pivotable ball and socket assembly 27 that is secured to an adjustable plate 28. The plate 28 is adapted to slide along vertical guide posts 29 in response to the movement of a rack 30. The toothed or notched portion of the rack 30 engages a gear 32 which is driven by a reversible motor 34. When the motor 34 is actuated to drive the gear 32, the rack 30 raises or lowers the plate 28, thereby elevating or lowering the assembly including the workpiece 16 supported by the plate 28.

To achieve motion along the horizontal plane (X direction), perpendicularly relative to the beam 12, a reversible drive motor 36 may be energized to rotate a pinion or gear 38, which cooperates with a rack 40. The rack 40 is secured to the lower surface of a guide section 42, that is seated in channels formed within vertical supports 44. The guide section 42 may be urged along the horizontal channels when the motor 36 is energized, causing the assembly carried by the section 42 to move in a horizontal plane orthogonally relative to the beam 12. In this manner, the workpiece 16 may be moved in the X–Y directions, thereby affording scanning of the face of the workpiece 16 by the stationary laser beam. It should be understood that the laser beam itself may be deflected to provide desired scanning.

In the event that an arcuate or tortuous scan path is desired, a tilting means which includes a pair of complementary drive mechanisms are provided to rotate the workpiece in the X–Y plane. The drive mechanisms comprise a pair of drive motors 46 and 48 positioned diagonally on the plate 28. The motors 46 and 48 are adapted respectively to drive a pair of pinion and rack arrangements 50 and 52, conjointly. As a result, the table 26 may be pivoted on the pivotable assembly 27 about an axis parallel to or coincident with the optical beam path Z. Thus, the workpiece 16 may be moved and oriented relative to the laser beam 12 so that various patterns may be traced on the surface of the material being treated.

The drive motors 22, 34, 36, 46, and 48 are controlled by positioning mechanism circuits 56 that energize the motors selectively in response to an automated program 58, which may be a pre-recorded tape for example. The tape may also have recorded pulses thereon, in a predetermined time relationship relative to the recorded position instructions, these pulses serving to actuate a pulser 60 for turning the flash tube of the laser device 10 on or off.

In accordance with this invention, the process of chemically etching or decomposing the material of the work piece 16 is achieved by utilizing a reactive atmosphere in conjunction with the laser beam supplied to the work area. In a particular embodiment of this invention, the work piece 16 is a refractory metal, such as a tungsten body or plate that is to be etched or drilled. An open vessel 62 containing a halogen, such as iodine, is set on a hot plate 64 within the enclosure 18, and is heated by a heater element or coil 66 which receives current from a power supply 68. The iodine is vaporized at a temperature of about 600° C. to a vapor density of approximately one $\mu$ mol./cc.

At the same time, the laser beam 12 which may have a 25 micron diameter, is applied to the tungsten plate 16 at a spot or along a defined path on the plate, established by the predetermined program. The applied beam 12 heats the tungsten body 16 to a temperature in the range of 600° C.–1000° C. approximately, at which temperature a volatile halide, tungsten diodide ($WI_2$), is formed by the interaction of the tungsten metal and iodine vapor. In effect, the tungsten portions upon which the heat energy supplying laser beam impinges in the halogen vapor atmosphere are removed, such portions being measured in microns.

To recover the tungsten diodide, the enclosure 18 may be flushed by suction or other known means. Alternatively, the heater coil 66 may be made of tungsten and heated to 2000° C. At this temperature, the tungsten diodide compound decomposes, and the released tungsten will deposit on the coil 66 while the free regenerated iodine may be reclaimed.

In this vein, it should be noted that the process of etching refractory metals and ceramics is reversible so that materials may be grown by vapor deposition. To achieve the growing process, a substrate which may be a tungeten workpiece, for example, is disposed in a hydrogen atmosphere, while a laser beam is directed to selected portions of the workpiece. Tungsten hexaiodide vapor is then passed over the workpiece. The $WI_6$ decomposes at the spot where the laser beam is focused to form vapor deposited tungsten. Such deposited tungsten forms an excellent bond with many substrates, and may be used to "spot weld" ceramics and refractory metals, and for a wide variety of other applications. Other reactive atmospheres may be used for vapor depositing selected materials. As an example of other applications for this invention, niobium-tin circuit elements may be deposited on suitable substrates to form microminiature superconducting circuits. Also, microminiature arc lamps may be produced by depositing tungsten electrodes on quartz plates. The novel method taught herein may serve to spot weld ceramics and metals by vapor depositing joints at localized spots, or to provide seam welding. Many other uses for the inventive method are possible.

The inventive concept may also be utilized for etching circuit elements in semiconductor bodies, for example. Thus, the workpiece 16 may be a silicon wafer, and the substance in the vessel 62 may be antimony, for example. The antimony is heated to form a vapor within the enclosure 18. Upon the application of a laser beam to a selected area or areas of the wafer, the antimony is deposited thereby providing doping by diffusion in an expedient and controlled fashion. Boundary junctions and circuit paths may be formed in materials such as germanium, gallium arsenide and the like in a precise form on relatively small semiconductor bodies.

The chemical-laser machining method defined herein provides advantages not found with prior known thermal machining methods. For example, moderate power continuous wave lasers or pulsed lasers may be used, and a higher rate of removal of material is possible with better control over the rate of removal. Also, the inventive method is reversible in that either removal or deposition of metals and ceramics may be affected.

The invention is not limited to the particular configuration, materials, and temperatures illustrated herein. For example, an iodine vapor gun aligned with the laser beam may be employed without the need for a container to enclose the vapor. Also, in lieu of iodine, other atmospheres such as oxygen may be utilized.

There has been described herein a method and means for forming, etching, cutting and processing materials by use of a laser beam in conjunction with an atmosphere that reacts with the materials under treatment.

What is claimed is:
1. A method for processing a workpiece having a relatively high temperature of vaporization comprising the steps of:
   (A) Causing a predetermined active atmosphere to contact the surface of a workpiece desired to be processed.
   (B) Directing a concentrated beam of laser type light onto the surface of the workpiece to be processed for locally heating selected area of the workpiece to the reaction temperature of said active atmosphere with said workpiece while said active atmosphere is contacting the workpiece surface to process the workpiece by causing a reaction between the workpiece and the atmosphere, said beam of light being of insufficient intensity to cause vaporization of said workpiece.
2. A method for machining a workpiece having a relatively high temperature of vaporization comprising the steps of:
   (A) Causing a predetermined active atmosphere to contact the surface of a workpiece desired to be etched;
   (B) Directing a concentrated beam of laser type light onto the surface of the workpiece to be etched for locally heating selected area of the workpiece to the reaction temperature of said active atmosphere with said workpiece while said active atmosphere is contacting the workpiece surface to etch the workpiece by causing a reaction forming a compound between said workpiece and said atmosphere, said beam of light being of insufficient intensity to cause vaporization of said workpiece;
   (C) Removing the reaction products from the surface of said workpiece.
3. The method of claim 2 wherein the step of remov- ing of the reaction products comprises the step of dissolving the products in solution.

4. The method according to claim 2 wherein the active component of the atmosphere is a halogen gas and the workpiece is a refractory material.

References Cited

UNITED STATES PATENTS

| | | | |
|---|---|---|---|
| 2,698,812 | 1/1955 | Schladitz | 117—107.2 |
| 2,762,702 | 9/1956 | Howard | 117—107.2 |
| 2,820,722 | 1/1958 | Fletcher | 117—107.2 |
| 2,885,310 | 5/1959 | Olson et al. | 117—107.2 |
| 3,181,170 | 4/1965 | Akin | 331—94.5 |
| 3,217,088 | 11/1965 | Steierman | 331—94.5 |
| 3,236,707 | 2/1966 | Lins | 96—36.2 |
| 3,257,246 | 6/1966 | Grosvalet | 156—17 |
| 3,265,855 | 8/1966 | Norton | 331—94.5 |

MURRAY KATZ, *Primary Examiner.*